W. M. THOMAS.
METAL FRAME CONSTRUCTION.
APPLICATION FILED NOV. 4, 1913. RENEWED APR. 19, 1920.
1,397,746.
Patented Nov. 22, 1921.
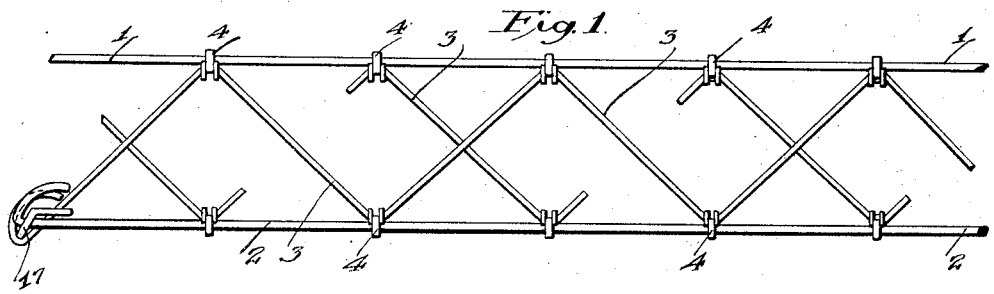
Fig. 1.
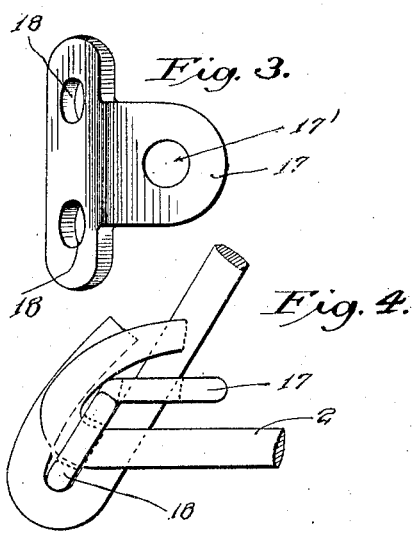
Fig. 3.
Fig. 4.
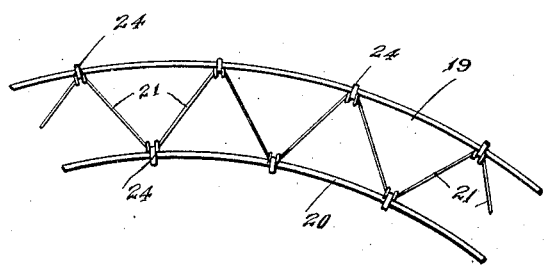
Fig. 2.
Inventor
William M. Thomas
by Lyon & Hackley
Attys
Witnesses:

UNITED STATES PATENT OFFICE.

WILLIAM M. THOMAS, OF LOS ANGELES, CALIFORNIA.

METAL FRAME CONSTRUCTION.

1,397,746.   Specification of Letters Patent.   Patented Nov. 22, 1921.

Application filed November 4, 1913, Serial No. 799,147. Renewed April 19, 1920. Serial No. 375,161.

*To all whom it may concern:*

Be it known that I, WILLIAM M. THOMAS, a citizen of the United States, residing at Los Angeles, in the county of Los Angeles and State of California, have invented a new and useful Metal Frame Construction, of which the following is a specification.

This invention relates to improvements in construction of metal frames, such as girders, columns and the like, and the main object of the invention is to provide a simple and effective truss construction for such purposes.

A further object of the invention is to provide improved means for connecting the diagonal members of a truss construction to the longitudinal members thereof.

Though some of the features of this invention are applicable to small, light structures, the construction is especially adapted for use in connection with concrete as the reinforcement members thereof.

Other objects of the invention will appear hereinafter.

The accompanying drawings illustrate embodiments of my invention, and referring thereto:

Figure 1 is a side elevation of a girder constructed according to my invention.

Fig. 2 is a side elevation of an arch girder constructed according to my invention.

Fig. 3 is a plan view of a connector for use at the end of the frame.

Fig. 4 is an enlarged side elevation of the connector illustrated in Fig. 3, showing said connector connected with the longitudinal and truss members at the end of the frame.

The girder shown in Fig. 1 comprises a plurality of upper longitudinal members 1, and a plurality of lower longitudinal members 2. The upper and lower members are connected together by the oblique or diagonally extending member or rod 3 secured to the upper and lower members by the joints or connectors 4.

At the ends of the frame or girder a joint member may be used consisting of an angular metal plate 17 perforated in one of its legs as at 17' and having holes 18 in its other leg. The longitudinal bars or rods 1 are bent over and back through said holes 18, and the diagonal rod 3 is passed through perforation 17', and bent back over plate 17.

The invention is applicable to a curved as well as to a straight girder. Thus Fig. 2 shows an arch girder constructed according to this invention, the upper and lower members 19 and 20 thereof being connected by diagonal or truss rods 21 secured to the upper and lower members by joint members 24 similar to the members 4. The joint members 4, 24 are not claimed herein since they are for a distinct invention from that disclosed and claimed in the present specification.

What I claim is:

The combination with a bar and a rod extending at an angle to said bar, of a joint member comprising an angular plate having legs and provided with a perforation in one of its legs and provided with a hole in its other leg, the leg having the hole extending substantially parallel to the bar and said brace rod passing through said hole and being bent over the end of the other leg, and said bar passing through the perforation and being bent toward the parallel leg.

In testimony whereof, I have hereunto set my hand at Los Angeles, California, this 27th day of October, 1913.

WILLIAM M. THOMAS.

In presence of—
ARTHUR P. KNIGHT,
LORRAINE E. DURRAN.